United States Patent [19]

Aureli et al.

[11] Patent Number: 5,463,811
[45] Date of Patent: Nov. 7, 1995

[54] SPHERICAL BEARING AND METHOD OF ASSEMBLING A SPHERICAL BEARING

[75] Inventors: William D. Aureli, Watertown; Robert E. Furst, Griswold, both of Conn.

[73] Assignee: The Torrington Company, Torrington, Conn.

[21] Appl. No.: 331,199

[22] Filed: Oct. 28, 1994

Related U.S. Application Data

[63] Continuation of Ser. No. 85,438, Jun. 30, 1993, abandoned.

[51] Int. Cl.⁶ .................................................. B23P 15/00
[52] U.S. Cl. ........................ 29/898.046; 29/898.017; 29/505; 384/208
[58] Field of Search .................... 29/898.046, 898.047, 29/898.044, 898.062, 898.064, 505, 575, 520; 384/208

[56] References Cited

U.S. PATENT DOCUMENTS

| | | | |
|---|---|---|---|
| Re. 18,843 | 5/1933 | Skillner | 29/898.046 |
| 2,382,773 | 8/1945 | Chambers et al. | |
| 2,400,506 | 5/1946 | Heim | |
| 2,675,279 | 4/1954 | Heim | |
| 3,351,999 | 11/1967 | McCloskey | 29/898.046 |
| 3,444,606 | 5/1969 | Jones | 29/898.044 |
| 3,700,295 | 10/1972 | Butzow et al. | |
| 3,801,395 | 4/1974 | Stuck | 156/73 |
| 4,003,666 | 1/1977 | Gaines et al. | 403/36 |
| 4,089,095 | 5/1978 | Becher | 29/898.044 |
| 4,337,559 | 7/1982 | Rangel | 29/898.044 |
| 4,571,811 | 2/1986 | Pruvost | 29/898.047 |
| 4,606,434 | 8/1986 | Vasilow et al. | |
| 4,872,248 | 10/1989 | Rocrun et al. | 29/898.047 |

FOREIGN PATENT DOCUMENTS

| | | |
|---|---|---|
| 1329437 | 4/1963 | France. |
| 19 05 067.0 | 8/1970 | Germany. |
| 91 14 279.2 | 2/1992 | Germany. |
| 568117 | 1/1943 | United Kingdom. |
| 1285794 | 8/1972 | United Kingdom. |

*Primary Examiner*—Irene Cuda
*Attorney, Agent, or Firm*—John C. Bigler

[57] ABSTRACT

An outer ring is formed with counterbores at the ends thereof, disposed along a common axis and separated by a radially inwardly extending keel portion. A polymer liner is inserted into each end of the outer ring into abutment with the keel portion, the polymer liners being preformed with spherically concave inner surfaces conforming to a ball part entrapped therebetween. A portion of the outer ring is then deformed by upset forming over a portion of the polymer liners to lock the polymer liners in position. An electrical sensor for indicating failure of the polymer liners is also disclosed.

10 Claims, 1 Drawing Sheet

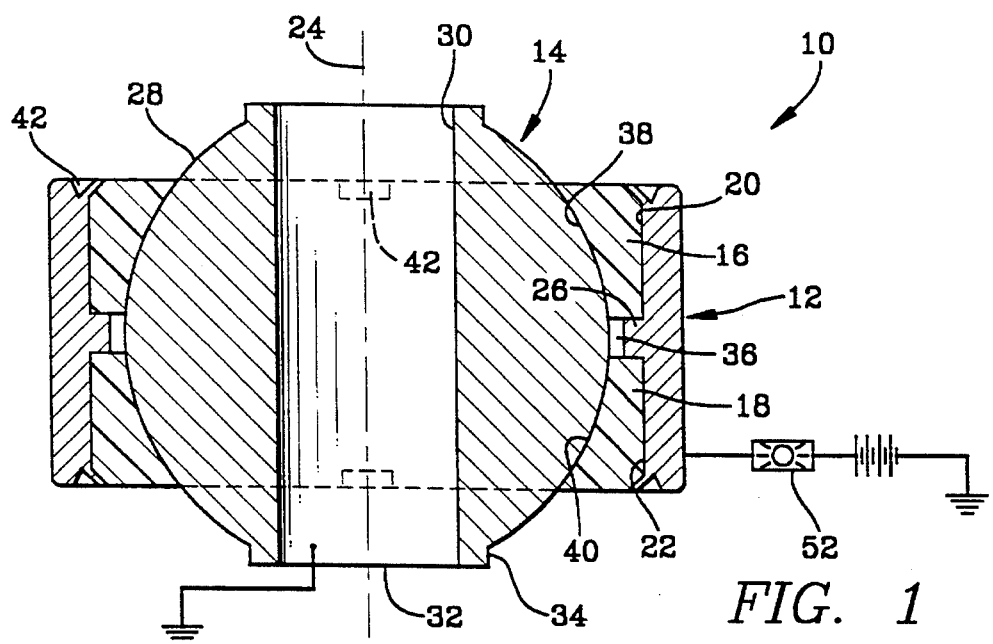
FIG. 1
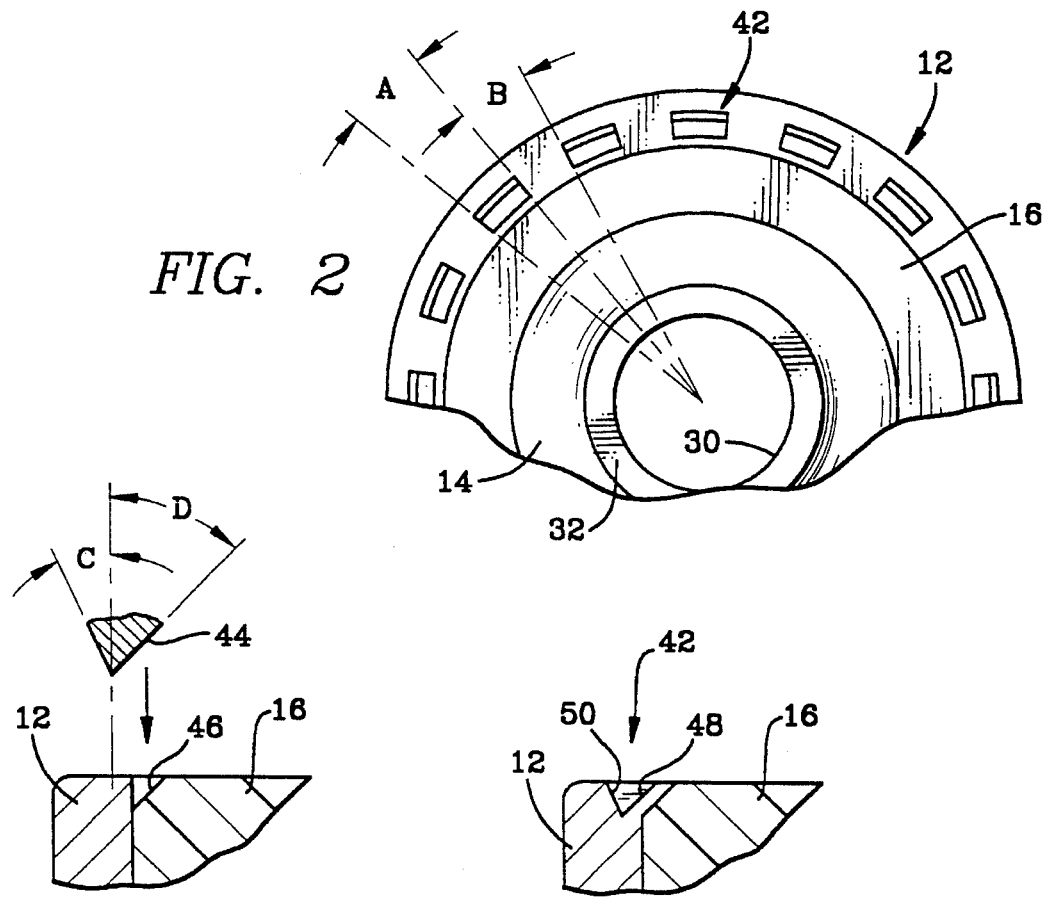
FIG. 2
FIG. 3
FIG. 4

000000
SPHERICAL BEARING AND METHOD OF ASSEMBLING A SPHERICAL BEARING

This is a continuation of application Ser. No. 08/085,438 filed Jun. 30, 1993, abandoned.

BACKGROUND OF THE INVENTION

This invention relates generally to self-aligning spherical bearings and, more particularly, to heavy duty spherical bearings with solid liners as used, for example, in rod end bearings.

Generally, rod end bearings used in aircraft controls and similar applications require a self-aligning configuration with a solid liner of bronze, brass, polymer, fabric or other bearing material supported by a close fitting steel housing. Snap-together assemblies utilizing resilient liners of nylon or similar material result in spherical bearings that do not provide sufficient strength for these demanding applications and do not satisfy the rigorous military specifications.

One method currently used to fabricate heavy duty spherical bearings employs a machined cylindrical sleeve with radially inwardly extending end flanges restricting the end opening of the entrance face. After a liner is manually positioned on the recessed cylindrical surface between the flanges, the sleeve is coined around the ball part of the bearing in a large press, causing the liner to conform, generally, to the shape of the ball part. The bearing is then cured and machined.

Such fabrication requires a long process time, 24 hours or more including the curing step, and often results in an irregular liner which may trap dirt and have non-uniform contact points, affecting performance. The required tedious labor and large press add to the high cost of manufacture. And, due to the distortion caused during coining of the sleeve, the length and diameter of the sleeve must be machined to the sleeve's finished dimensions after assembly of the bearing.

The foregoing illustrates limitations known to exist in present spherical bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method of assembly for a spherical bearing. In one step, an outer ring is formed with counterbores at the ends thereof, disposed along a common axis and separated by a radially inwardly extending keel portion. A ball part is provided having a spherical diameter less than the inner diameter of the keel portion such that a clearance results between the ball part and the keel portion. A polymer liner is inserted into each end of the outer ring into abutment with the keel portion, the polymer liners having preformed spherically concave inner surfaces conforming to the ball part entrapped therebetween. A portion of the outer ring is then deformed over a portion of the polymer liners to lock the polymer liners in position.

The foregoing and other aspects will become apparent from the following detailed description of the invention when considered in conjunction with the accompanying drawing figures.

BRIEF DESCRIPTION OF THE DRAWING FIGURES

FIG. 1 is a cross sectional view illustrating an embodiment of the spherical bearing of the present invention, with a sensing means indicated schematically;

FIG. 2 is an end view of a portion of the spherical bearing of FIG. 1;

FIG. 3 is an enlarged cross sectional view of a partially formed portion of the outer ring and polymer liner of the spherical bearing of FIG. 1, with a portion of the tooling to be applied also shown in cross-section; and FIG. 4 is an enlarged cross sectional view of the portion of the outer ring and polymer liner of FIG. 3 after upset forming.

DETAILED DESCRIPTION

Referring now to the drawings, FIG. 1 illustrates an embodiment of the present invention as spherical bearing 10 resulting from the method of assembly described herein. Spherical bearing 10 comprises outer ring 12, ball part 14, and polymer liners 16 and 18.

Outer ring 12 is formed with counterbores 20 and 22 at the ends of outer ring 12 and disposed along common axis 24. Counterbores 20 and 22 are separated by keel portion 26 which extends radially inwardly toward ball part 14 midway between the ends of outer ring 12. Keel portion 26 may be a ridge with rectangular cross-section as shown, or may be rounded or of other configuration providing a suitable abutment surface for polymer liners 16 and 18, as described below.

Outer ring 12 may be held in a fixture or housing or may be formed with a shank extending radially with respect to axis 24, thus making outer ring 12 an eye member of a rod end or similar device. However, the present invention is not to be limited to rod end bearing applications and may take various forms. Outer ring 12 may be made of mild or stainless steel or other suitable malleable material, by machining or other means.

Ball part 14 has spherical outer surface 28 and central bore 30 along axis 24. Central bore 30 is provided to receive a control rod, mounting fastener, or other shaft for self-aligning rotation with respect to outer ring 12. Ball face 32 may extend axially by means of shoulders 34, as shown, or may be a simple truncation of spherical outer surface 28, or may be omitted altogether. Ball part 14 may be machined of mild or stainless steel, for example.

The spherical diameter of ball part 14 along spherical outer surface 28 is less than the inner diameter of keel portion 26 such that clearance 36 results between ball part 14 and outer ring 12. Thus, polymer liners 16 and 18 are spaced apart axially by keel portion 26 and clearance 36. Clearance 36 may be filled with a lubricant and connected with a lubrication channel or reservoir, not shown, to serve as a lubrication groove or may be left open, as illustrated.

During assembly, ball part 14 is positioned within outer ring 12 and polymer liners 16 and 18 are inserted into counterbores 20 and 22 from the ends of the outer ring into abutment with keel portion 26. Polymer liners 16 and 18 are preformed with spherically concave inner surfaces 38 and 40, respectively, which conform to spherical outer surfaces 28 of ball part 14 when the liners abut keel portion 26.

As illustrated in FIG. 2, indentations 42 are spaced circumferentially along the end faces of outer ring 12. Indentations 42 are formed as part of a unique upset forming technique that deforms portions of outer ring 12 radially inward over a portion of polymer liners 16 and 18 while maintaining the initial overall axial length and diameter of outer ring 12. Indentations 42 may be located near the inside diameter of outer ring 12, as shown, or may be located nearer the outside diameter thereof while still providing the desired radially inward flow of material.

Preferably, indentations 42 comprise approximately one-half the circumference of outer ring 12, the other half of the circumference of outer ring 12 being distributed in even increments between indentations 42. In other words, arcuate length "A" of indentations 42 is approximately equal to arcuate length "B" of the increments between indentations 42. The preferred number of indentations 42 is between 8 and 32 for a spherical bearing of typical size, the specific number being dependent upon the size of the bearing and the materials used.

As illustrated in FIGS. 3 and 4, indentations 42 are formed by discrete tool portions 44 of wedge-shaped tooling. The radially outward surface of tool portions 44 forms an angle "C" from a line normal to the face of outer ring 12, and the radially inward surface of tool portions 44 forms an angle "D" from that line. The same angles are formed with respect to axis 24 of outer ring 12, which is parallel to the normal line just described. The term wedge-shaped is intended to include variations with curved surfaces in addition to the single angular shape shown.

As indicated, tool portions 44 are moved along the normal line into outer ring 12 such that a portion of outer ring 12 is deformed and moved radially inwardly over a portion of polymer liner 16 or 18. Preferably, polymer liner 16 or 18 is preformed with beveled surface 46 and the deformed portion of outer ring 12 has the form of first ramp surface 48, which is impressed with angle "D" of tool portions 44. A preferred angle of first ramp surface 48 is 45 degrees, as illustrated, the preferred range being between 15 and 60 degrees with respect to axis 24.

Tool portions 44 also include a stop surface defined by angle "C" which engages second ramp surface 50 and thereby stabilizes the material of outer ring 12, limiting thinning and radially outward movement of the material. A preferred angle of ramp surface 50 is 15 degrees, as illustrated; however, a range of zero to approximately 45 degrees may be used with similar effect. As illustrated in FIG. 1, indentations 42 have a rectangular configuration in cross-section when viewed radially, tool portions 44 being of the same rectangular shape.

Polymer liners 16 and 18 may be formed of various materials, with or without fillers, provided that the material possesses the desired performance requirements, such as temperature stability, low friction and low wear. High performance polymers such as polyetheretherketone (PEEK) and polyamidimide have been found to be suitable. A preferred material is commercially available polyimide with graphite fibers for strength and low friction fillers for lubrication. However, other reinforcement and lubrication fillers, such as for example Teflon, may be used.

As illustrated schematically in FIG. 1, a sensing circuit may be added to sense electrical conductivity between outer ring 12 and ball part 14 to indicate wear or failure of polymer liners 16 and 18. The sensing circuit may include indicator means 52, such as a warning light, alarm, or other device and a power source. Simple electrical connections may be used, depending on the particular application, to provide grounding of outer ring 12 or ball part 14 and to provide electrical connection of indicator means 52 to the other of these two elements.

The present invention facilitates more precise initial machining of the outer race because the overall dimensions of the outer race are no longer deformed while encapsulating the liner. Unlike previous methods using liners laid in a recessed cylindrical surface of an outer ring, the disclosed method of assembly allows liners with preformed ball-conforming surfaces to be conveniently inserted axially into the outer ring by machine. The unique upset forming technique effectively clinches the liners in position while imparting virtually line for line contact with the ball part, thus improving wear characteristics.

Having described the invention, what is claimed is:

1. A method of making a spherical bearing, the method comprising the steps of:

forming an outer ring with counterbores at the ends thereof, disposed along a common axis and separated by a radially inwardly extending keel portion;

providing a ball part having a spherical diameter less than the inner diameter of the keel portion such that a clearance results between the ball part and the keel portion;

inserting a polymer liner into each end of the outer ring into abutment with the keel portion, the polymer liners having preformed spherically concave inner surfaces conforming to the ball part entrapped therebetween; and deforming a portion of the outer ring over a portion of the polymer liners to lock the polymer liners in position.

2. The method according to claim 1, wherein the polymer liners are preformed with a beveled outer surface and wherein the deformed portion of the outer ring overlies the beveled outer surface to lock the polymer liners in position.

3. The method according to claim 1, wherein the deforming of the outer ring is effected by upset forming, whereby circumferentially spaced material of the outer ring is moved radially inwardly while the overall length and diameter of the outer ring remain substantially unchanged.

4. The method according to claim 3, wherein the upset forming is effected by engagement with discrete portions of wedge-shaped tooling including angled surfaces for moving portions of the outer ring radially inwardly.

5. The method according to claim 4, wherein the angled surfaces of the wedge-shaped tooling form an angle between 15 and 45 degrees with respect to the axis of the outer ring.

6. The method according to claim 4, wherein the wedge-shaped tooling engages approximately half the circumference of the outer ring, the other half of the circumference being distributed in even increments between the discrete portions of wedge-shaped tooling.

7. The method according to claim 6, wherein the number of discrete portions of wedge-shaped tooling is between 8 and 32.

8. The method according to claim 1, wherein the polymer liners include a filler material for reducing friction between the ball part and the polymer liners.

9. The method according to claim 1, wherein the polymer liners include a filler material for providing reinforcement.

10. The method according to claim 1, further comprising the step of connecting sensing means to the outer ring and the ball portion such that electrical conductivity between the outer ring and the ball portion is sensed to indicate wear or failure of the polymer liners.

* * * * *

UNITED STATES PATENT AND TRADEMARK OFFICE
CERTIFICATE OF CORRECTION

PATENT NO. : 5,463,811

DATED : Nov. 7, 1995

INVENTOR(S) : William D. Aureli, Watertown; Robert E. Furst, Griswold, both of Conn.

It is certified that error appears in the above-identified patent and that said Letters Patent is hereby corrected as shown below:

Column 1, line 6, insert the following :

This invention was made with Government support under Contract No. #DAAJ02-91-0049 awarded by the Aviation Applied Technology Directorate, U.S. Arm Aviation and Troop Command, Fort Eustis, VA 23604-5577. The Government has certain rights in this invention.

Signed and Sealed this

Fourth Day of January, 2000

Attest:

Attesting Officer

*Acting Commissioner of Patents and Trademarks*